United States Patent
Jones et al.

[19]

[11] Patent Number: 6,124,907
[45] Date of Patent: *Sep. 26, 2000

[54] LIQUID CRYSTAL DISPLAY WITH INTERNAL POLARIZER AND METHOD OF MAKING SAME

[75] Inventors: Michael R. Jones, South Lyon; John Z. Z. Zhong, Novi, both of Mich.

[73] Assignee: OIS Optical Imaging Systems, Inc., Northville, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 09/065,879

[22] Filed: Apr. 24, 1998

[51] Int. Cl.⁷ ...................... G02F 1/1335; G02F 1/1333; G02F 1/1337

[52] U.S. Cl. ........................... 349/96; 349/106; 349/110; 349/123

[58] Field of Search ............................ 349/96, 106, 110, 349/123

[56] References Cited

U.S. PATENT DOCUMENTS

| | | | |
|---|---|---|---|
| 4,180,433 | 12/1979 | Glass eta l. | 162/3 |
| 4,241,984 | 12/1980 | Leibowitz | 350/337 |
| 4,796,979 | 1/1989 | Tsuboyama | 350/350 |
| 5,032,009 | 7/1991 | Gibbons et al. | 359/76 |
| 5,073,294 | 12/1991 | Shannon et al. | 359/76 |
| 5,179,457 | 1/1993 | Hirataka et al. | 359/73 |
| 5,249,070 | 9/1993 | Takano | 359/54 |
| 5,473,455 | 12/1995 | Koike et al. | 359/76 |
| 5,479,282 | 12/1995 | Toko et al. | 359/75 |
| 5,499,126 | 3/1996 | Abileah et al. | 359/68 |
| 5,559,618 | 9/1996 | Mori | 359/73 |
| 5,583,679 | 12/1996 | Ito et al. | 349/118 |
| 5,589,963 | 12/1996 | Gunning, III et al. | 349/119 |
| 5,599,478 | 2/1997 | Matumoto et al. | 252/249.01 |
| 5,612,801 | 3/1997 | Winker | 349/119 |
| 5,619,352 | 4/1997 | Koch et al. | 349/89 |
| 5,694,183 | 12/1997 | Ilcisin et al. | 349/32 |
| 5,751,390 | 5/1998 | Crawford et al. | 349/120 |

FOREIGN PATENT DOCUMENTS

| | | |
|---|---|---|
| 0397263 | 11/1990 | European Pat. Off.. |
| 0887692 | 12/1998 | European Pat. Off.. |
| 98607941 | 3/1996 | WIPO. |

OTHER PUBLICATIONS

"LCD With Internal Polarizers," Polarizer International, LLC (Date Unknown) [6 pages].

*Primary Examiner*—William L. Sikes
*Assistant Examiner*—Tarifur R. Chowdhury
*Attorney, Agent, or Firm*—Jeffrey H. Canfield; Laff, Whitesel & Saret, Inc.

[57] ABSTRACT

A liquid crystal display includes at least one polarizer located interior or internally of substrates of the display. In certain embodiments, the polarizer may be spin-coated onto the interior of one of the substrates, preferably the passive substrate of the display. Such a polarizer may also be located interior of color filters on the copassive substrate. Thus, light being transmitted through the display proceeds through the front polarizer prior to being de-polarized by the color filters. The result is improved contrast ratios in the display due to the minimization of the de-polarizing of color filters. In certain embodiments, the internal polarizer(s) may be photo-patternable by way of ultraviolet photo-imaging.

7 Claims, 7 Drawing Sheets

LIQUID CRYSTAL DISPLAY WITH INTERNAL POLARIZER AND METHOD OF MAKING SAME

RELATED APPLICATIONS

This application is related to U.S. Ser. No. 09/057,601, filed Apr. 9, 1998, and to U.S. Ser. No. 09/053,039, filed Apr. 1, 1998, the entire disclosures of which are hereby incorporated herein by reference.

This invention relates to a liquid crystal display including at least one polarizer. More particularly, this invention relates to a liquid crystal display (LCD) including at least one polarizer located between opposing substrates of the display.

BACKGROUND OF THE INVENTION

In conventional liquid crystal displays (LCDs), polarizers are typically positioned exterior or outside of opposing substrates of the display. For example, see certain illustrations in U.S. Pat. No. 5,499,126 (i.e. the '126 patent), the disclosure of which is incorporated herein by reference. As shown in the '126 patent, conventional LCDs include a liquid crystal (LC) layer sandwiched between first and second opposing glass substrates. In turn, the combination of the glass substrates and liquid crystal layer is disposed between first and second polarizers. Thus, typical LCD polarizing layers are positioned on the outside or exterior of the glass substrates, while color filters are positioned interior of the substrates.

In conventional LCDs, color filters are often located on the passive or viewer-side glass substrate and positioned between the polarizers and also between the opposing substrates. For example, as shown in FIGS. 20 and 21 of the '126 patent, red, green, and blue color filters are located on the interior of one of the glass substrates. Thus, the color filters are positioned both (a) between the opposing glass substrates, and (b) between the opposing polarizers.

Because color filters have a de-polarizing effect on light passing through a display due to pigment light scattering, light proceeding through conventional displays is at least partially de-polarized by the color filter(s) before reaching the analyzer (or viewer side polarizer). Unfortunately, de-polarizing of light prior to the light reaching the analyzing or viewer side polarizer can reduce contrast ratio of a display. Even though such de-polarizing effects are small, they do have a significant effect on a display's contrast ratio. This is especially true for advanced LCD compensation displays (i.e. displays having retarders for improving viewing characterisitics) which have increased contrast ratio over viewing angle (e.g. as disclosed in U.S. Pat. No. 5,739,881). In sum, de-polarizing effects caused by color filter(s) which occur prior to the viewer side polarization are undesirable because of the potential for significantly reducing contrast ratio of the display and the display's overall viewing characteristics.

A conventional approach to reducing adverse effects of color filter de-polarizing is the dispensement of smaller dye pigments in color filter material. Unfortunately, this requires a significant effort in chemical formulation, and cannot completely eliminate adverse effects of color filter de-polarizing.

Another problem of conventional LCDs is that the provision of polarizing layers on the outside or exterior of a display's substrates renders the polarizer(s) susceptible to degrading environmental conditions such as humidity and salt. It would be desirable if polarizers were not exposed to such environmental conditions.

Prior art or conventional polarizers are often mass-produced in roll form. For example, a roll of polymeric material, e.g. polyvinyl alcohol, may be dyed with dichroic material. Orientation of the polymer and dichroic molecules may be achieved by heating the dyed polymer and stretching it in the lengthwise or long direction of the roll. The result is a conventional stretched anisotropic light absorbing film with an absorption or optical axis (for polarizing) parallel to the stretching direction. A disadvantage of such a stretching manufacturing method of making polarizers is that the absorption or optical axis of the resulting polarizer(s) is typically parallel to the long direction of the roll. This orientation of the axis typically creates at least a 30% material yield loss for twisted nematic LCD applications. Such material waste results from cutting display-sized polarizer sheets from a polarizer roll at, for example, a 45° angle relative to the roll edge so that the polarizer absorption axis is not parallel to a side or edge of the polarizer. For example, in certain twisted nematic LCD applications, the polarizer absorption axis is typically positioned or aligned at a 45° angle relative to an edge of the display in order to achieve symmetric horizontal gray scale linearity (e.g. see the front page of the '126 patent). Thus, prior art stretching methods of manufacturing polarizers are undesirable.

Polarizer International LLC has disclosed an internal polarizer of liquid crystalline material. The polarizer may be positioned interior of an LCD's substrates. Unfortunately, shearing is typically required in order to define some type of axis in such polarizers. The use of shearing is impractical and inefficient in LCD fabrication processes, and furthermore cannot be used to pattern or pixelate polarizers.

It will be apparent from the above that there exists a need in the art for an improved liquid crystal display (LCD) including at least one (and potentially more than one) polarizer located between substrates of the display. This will reduce environmental hazards to polarizing material, improve contrast ratios exhibited by the display(s), result in an easier to make polarizer, etc. Still further, there exists a need in the art for an LCD including a polarizer positioned internal of color filter(s) so that the polarizer on the viewer side of the display may be positioned between the color filter(s) and the liquid crystal material in order to prevent adverse color filter de-polarizing effects from occurring prior to viewer side polarization. There also exists a need in the art for a non-stretching method for making polarizers for use in LCDS.

The term "interior" or "internal" as used herein means on the side or surface closest to the nematic liquid crystal material to which voltage is selectively applied via pixel electrodes. For example, if something is said to be positioned or located on the "interior" or "internal" side of a substrate, then it is positioned or located on the side of the substrate closest to the liquid crystal (LC) layer. Also, for example, the phrase "on the substrate" does not mean that it is located directly on the substrate, but only that it is ultimately supported by the substrate at some point during the manufacturing process.

This invention will now be described with respect to certain embodiments thereof, accompanied by certain illustrations.

SUMMARY OF THE INVENTION

Generally speaking, this invention fulfills the above described needs in the art by providing a liquid crystal display comprising:

a liquid crystal layer sandwiched between first and second substrates;

a plurality of color filters disposed between said liquid crystal layer and said first substrate;

an internal polarizer disposed between (i) said liquid crystal layer, and (ii) said color filters, in order to reduce adverse effects of depolarization caused by said color filters.

This invention further fulfills the above described needs in the art by providing a polarizer structure for use in a liquid crystal display, the polarizer structure comprising:

a substantially transparent substrate;

an alignment layer provided on said substrate, said alignment layer defining a polarizer alignment direction; and a polarizer layer on said substrate so as to be in direct contact with said alignment layer so that an optical axis of said polarizer layer is oriented in a direction dictated by said alignment direction defined by said alignment layer.

This invention further fulfills the above described needs in the art by providing a liquid crystal display comprising:

first and second substrates;

a liquid crystal layer positioned between said first and second substrates;

at least one electrode for selectively applying a voltage to said liquid crystal layer;

first and second polarizers positioned in a manner such that said first and second substrates are located in between said first and second polarizers, said first polarizer being located closest to a viewer of the display and including a polarizer optical axis;

a substantially transparent black matrix alignment layer provided on said first substrate, said black matrix alignment layer defining an alignment direction; and a black matrix layer provided on said first substrate in a position so that said black matrix layer is in direct contact with said black matrix alignment layer, and wherein said black matrix alignment layer is substantially transparent to a substantial portion of visible light rays and includes a black matrix optical axis which is oriented in a substantially different direction than said polarizer optical axis.

This invention still further fulfills the above described needs in the art by providing a liquid crystal display comprising:

first and second substrates;

a liquid crystal layer positioned between said first and second substrates;

electrodes for selectively applying voltage across said liquid crystal layer;

first and second liquid crystal alignment layers provided on opposite sides of said liquid crystal layer so as to align molecules of said liquid crystal layer;

a polarizer alignment layer disposed between said liquid crystal layer and said first substrate; and a first internal polarizer disposed directly adjacent said polarizer alignment layer, and said internal polarizer disposed between said liquid crystal layer and said first substrate.

This invention further fulfills the above described needs in the art by providing a method of making a polarizer structure on a substrate, and also a method of making an LCD including a polarizer or substantially transparent black matrix positioned interior of substrates of the display, wherein the polarizer layer including an immediately adjacent alignment layer which defines an alignment direction that dictates or determines in what direction an optical axis of the polarizer will be aligned.

This invention will now be described with respect to certain embodiments thereof, along with reference to the accompanying illustrations.

IN THE DRAWINGS

Figure 3:
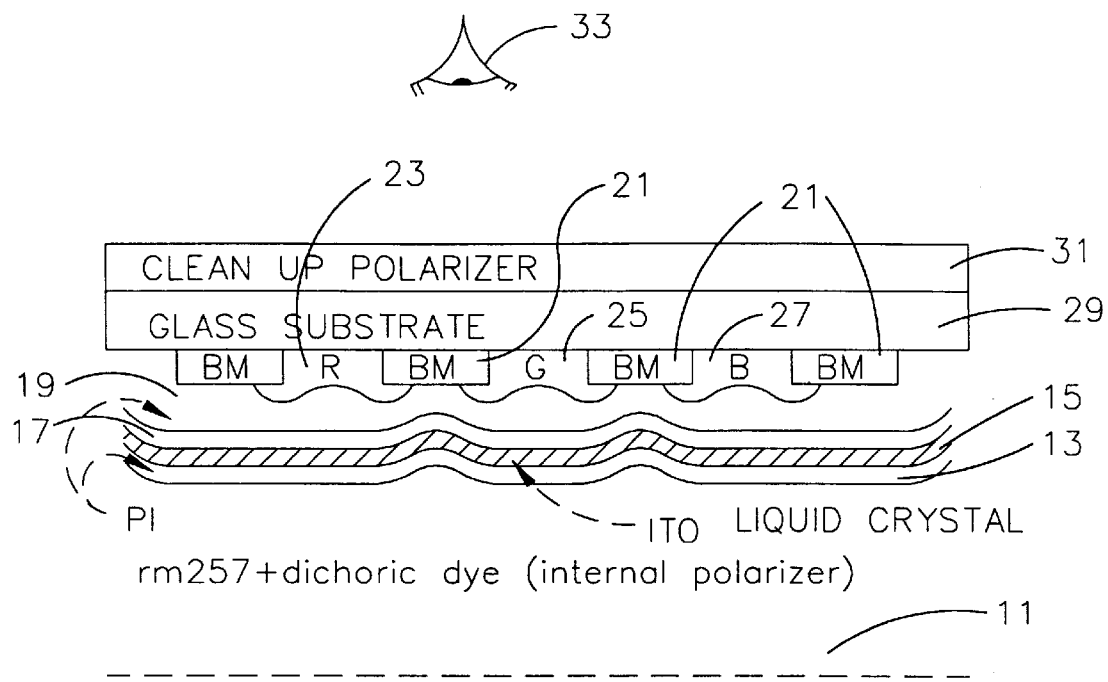
FIG. 3 is a partial side cross-sectional view of the passive plate (i.e. the substrate not having the active switching TFTs or diodes thereon) of the FIG. 1 LCD, and also of the passive plate of the FIG. 2 LCD.
Figure 4:
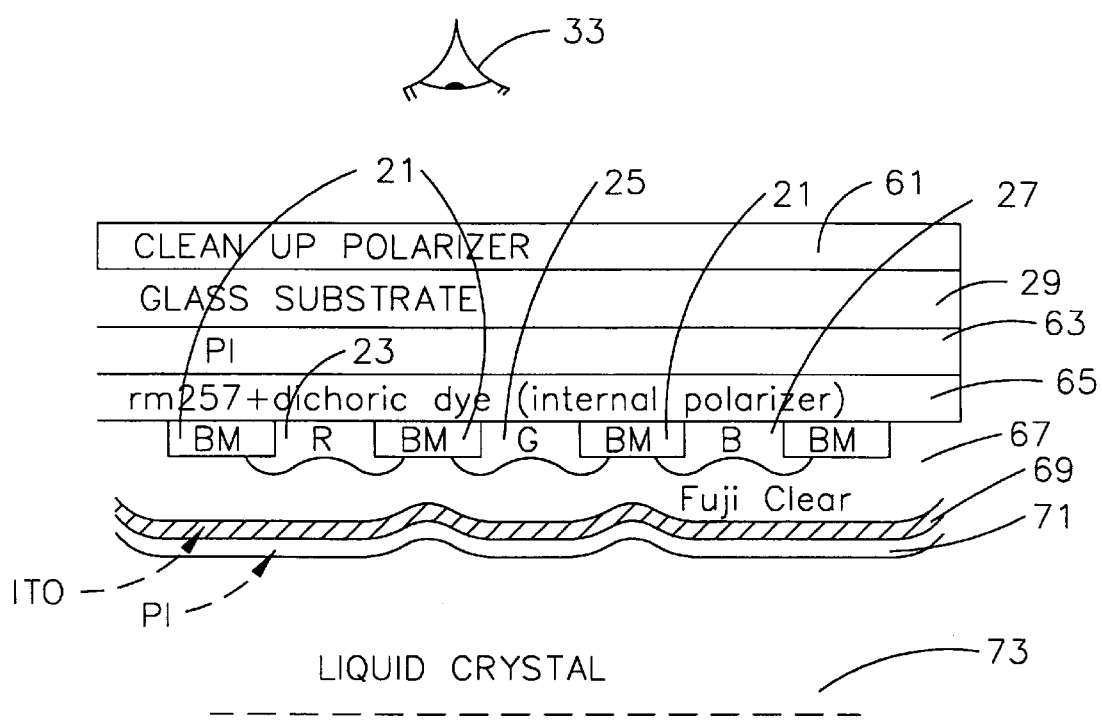
FIG. 4 is a partial side cross-sectional view of a portion of an LCD according to yet another embodiment of this invention, wherein a polarizer is positioned on a substrate between the substrate and color filter(s) which are on the substrate.
Figure 5:
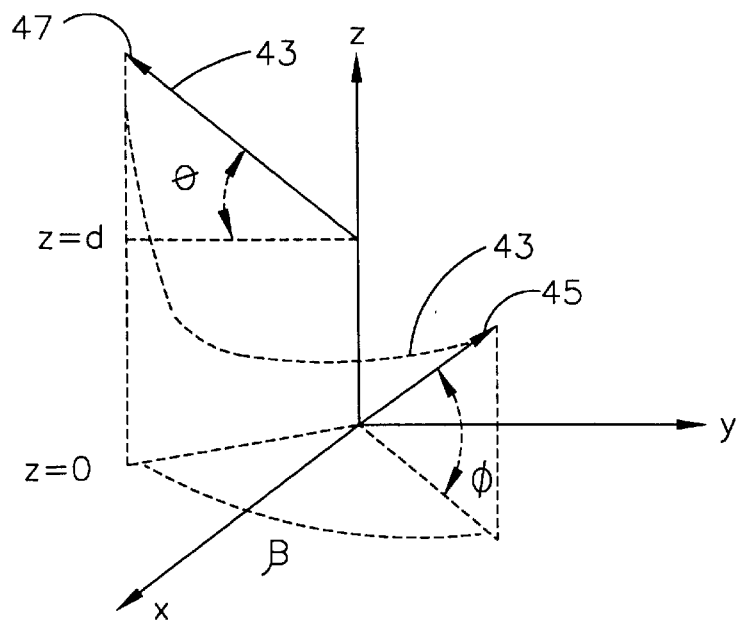

FIG. 5 illustrates a internal polarizer of any of FIGS. 1–4 or 7 of this invention wherein an optical axis of the polarizer is shown with tilt and twist throughout the thickness of the polarizer, wherein angle θ and angle Φ are the polar tilt angles at the top (the surface of the polarizer furthest from the adjacent polarizer alignment layer) and bottom (the side or surface of the polarizer closest to the adjacent polarizer alignment layer) of the layer, respectively, angle β is the total twist angle of the axis in the layer, and "d" is the thickness of the polarizer layer along the Z-axis.

Figure 6:
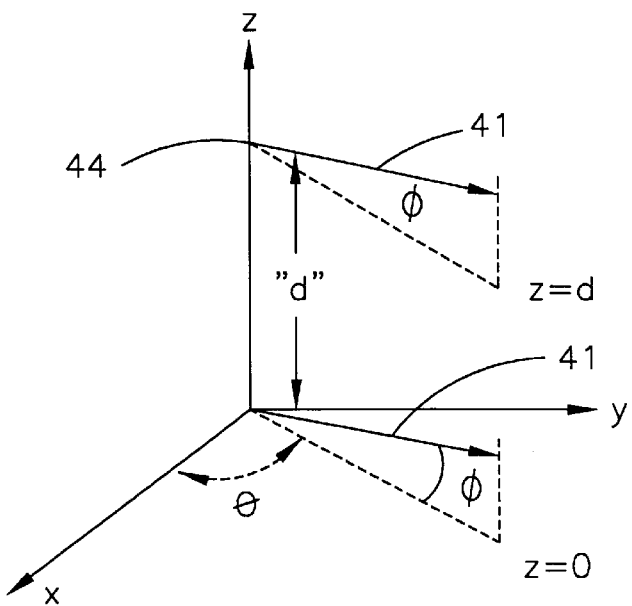

FIG. 6 illustrates a polarizer according to any of the FIGS. 1–4 or 7 embodiments of this invention wherein the optical polarizing axis has uniform tilt and substantially zero twist throughout the thickness of the polarizer, where angle θ is the azimuth or twist angle, angle Φ is the polar tilt or pre-tilt angle at each side or major surface of the polarizer layer, and the thickness of the polarizer layer is defined by "d" along the Z-axis.

Figure 7:
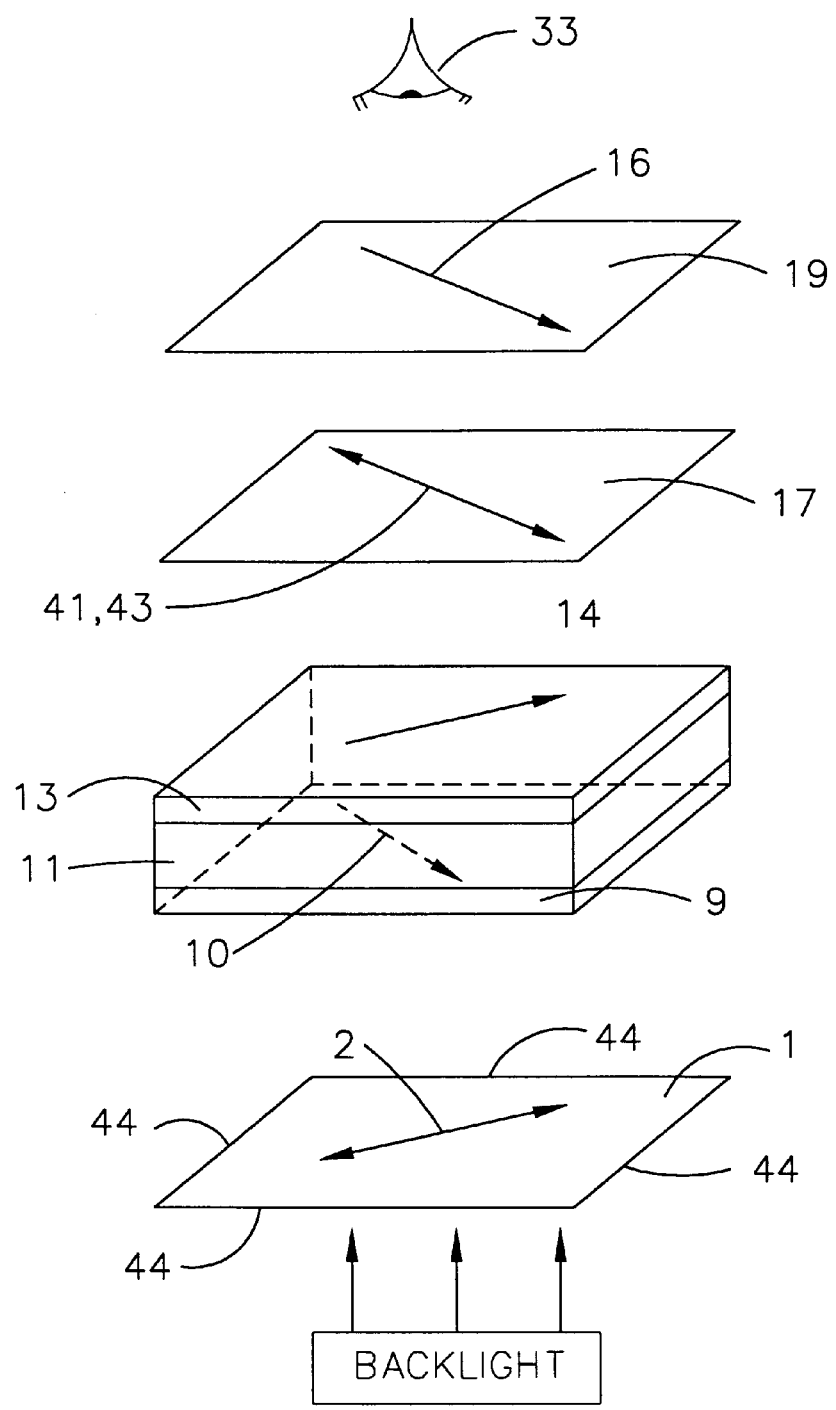

FIG. 7 is an exploded view of optical components in accordance with any embodiment of this invention, illustrating the rear polarizer, the front internal polarizer and its alignment layer, and the LC layer and corresponding orientation or buffing films.

Figure 8:
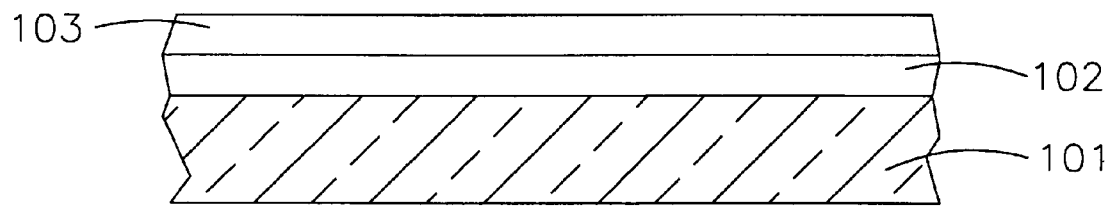

FIG. 8 is a side cross-sectional view of a polarizer structure according to an embodiment of this invention, wherein the structure includes a substrate upon which an alignment layer and immediately adjacent polarizer layer are provided.

Figure 9:
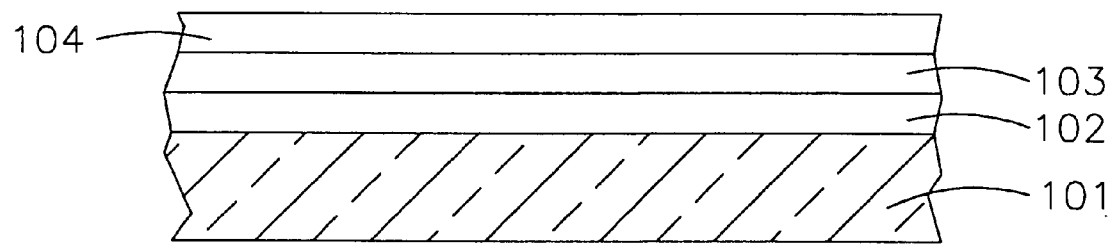

FIG. 9 is a side cross-sectional view of a combination polarizer and retarder structure according to an embodiment of this invention, wherein a retarder layer is provided over top of the polarizer layer of the FIG. 8 embodiment.

Figure 10:
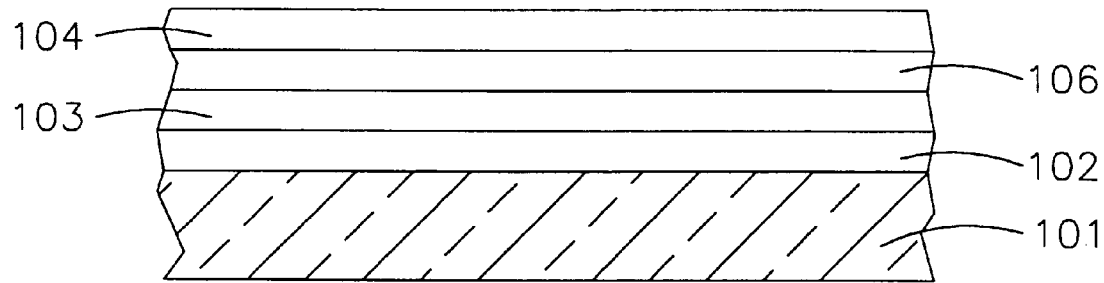

FIG. 10 is a side cross-sectional view of a combination polarizer and retarder structure according to another embodiment of this invention, wherein a retarder alignment layer and corresponding retarder are provided over top of the FIG. 8 structure.

Figure 11:
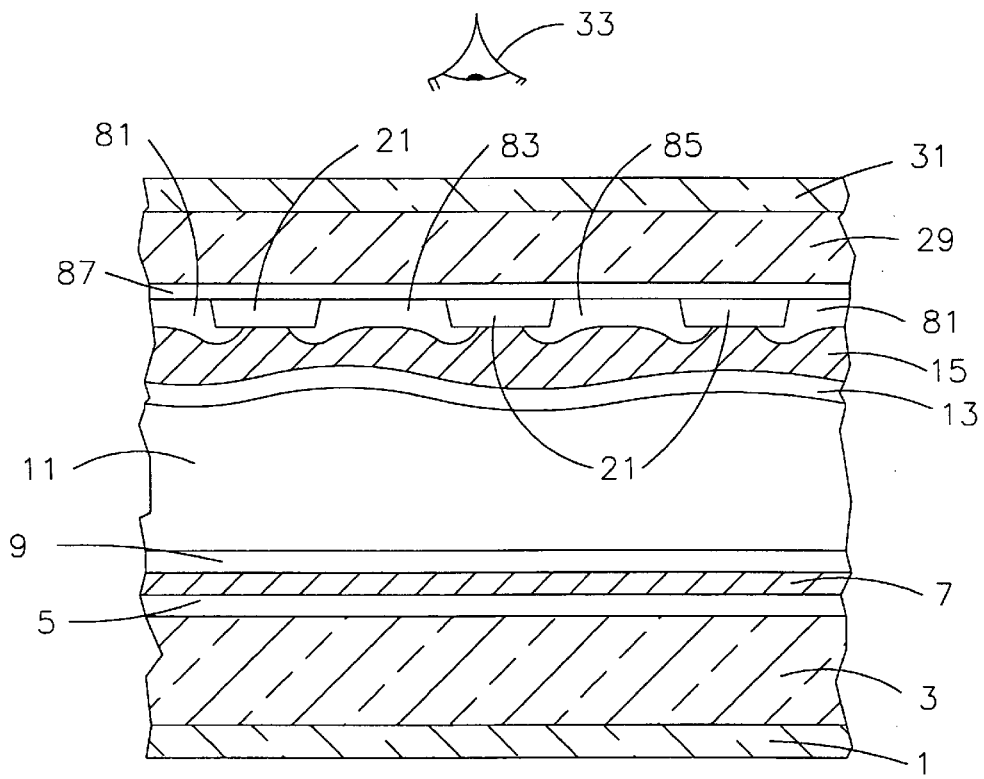

FIG. 11 is a side cross-sectional view of an LCD according to another embodiment of this invention wherein color filters function as both color filters and pixilated internal polarizers on a substrate of an LCD.

Figure 12:
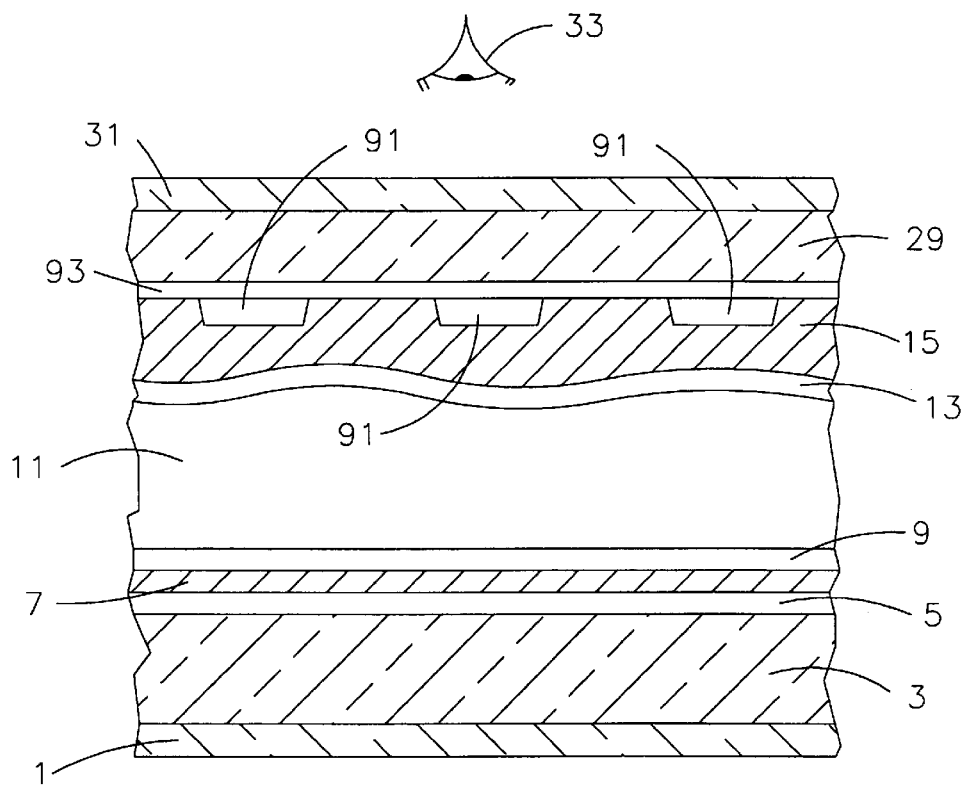

FIG. 12 is a side cross-sectional view of an LCD according to yet another embodiment of this invention wherein black matrix portions are formed on the interior of a display substrate by depositing an alignment layer and immediately adjacent reactive liquid crystalline layer which functions in a black matrix manner.

DETAILED DESCRIPTION OF CERTAIN EMBODIMENTS OF THIS INVENTION

Referring now more particularly to the accompanying drawings in which like reference numerals indicate like parts throughout the several views.

According to certain embodiments of this invention, color filter de-polarizing effects can be nullified or minimized by reversing the order of the color filter(s) and an analyzer (or viewer side polarizer) in an LCD. The viewer side polarizer (s) (i.e. analyzer) may be positioned internally of the color filters and internally of the front side display substrate in certain embodiments. As a result, light proceeding through the display goes through the primary and internally located viewer side polarizer before reaching and being depolarized by color filter(s). This minimizes any adverse effects which may be caused by depolarizing effects of color filters. It also reduces parallax because a viewer side polarizer is located internally of the viewer side substrate, and thus closer to the pixel apertures of the display than in conventional LCDs.

In certain embodiments, the color filters may be positioned interior of a polarizer, with the polarizer being located interior of the front or viewer side substrate of the LCD so that the interior polarizer's close proximity to the color filters reduces adverse effects of de-polarization caused by the color filters.

Light polarizing layers herein may be placed between substrates of a liquid crystal display (LCD) in close proximity to pixel apertures. As a result, the contrast ratio of the LCD will approach the contrast ratio of a light valve due to the internal placement of the polarizing layer(s) between the display's substrates. Furthermore, positioning of polarizers between the display's substrates improves the display's resistance to harsh environmental conditions including humidity and salt.

Polarizers 17, 53 according to certain embodiments of this invention also have the advantages of being spin-coatable and photo-patternable. Spin-coating is compatible with current passive plate (i.e. the substrate of the LCD which does not include active switching TFTs or switching diodes) manufacturing methods and allows for polarizer placement interior of the opposing substrates of a display. Prior art stretching manufacturing methods are not capable of practical internal polarizer placement in an LCD.

One way in which internal polarizers can be made in accordance with certain embodiments of this invention is to provide an alignment layer (e.g. buffed polyimide) and then the polarizer directly on the alignment layer so that the alignment direction defined by the alignment layer dictates and determines the direction and orientation of the polarizer axis.

Figure 1:
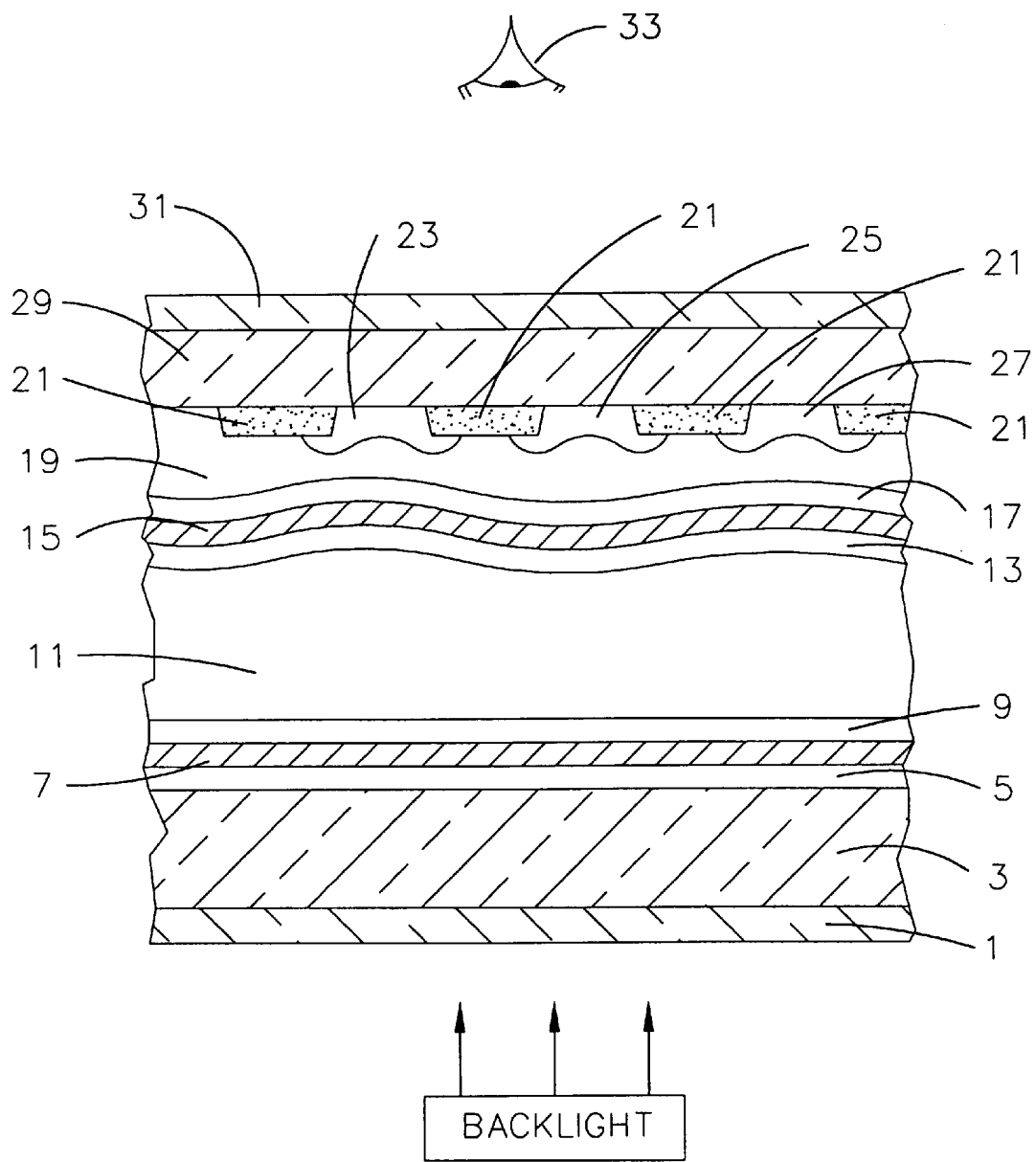
FIG. 1 is a side cross-sectional view of a liquid crystal display (LCD) according to an embodiment of this invention, wherein a polarizer on the viewer side of the display is located interior or internal of the front substrate and also internal of the color filters.

FIG. 1 is a side cross-sectional view of a liquid crystal display (LCD) according to an embodiment of this invention, wherein a polarizing layer on the front or passive substrate 29 is located interior of color filters 23, 25, 27. The display of FIG. 1 includes rear linear polarizer 1, rear substantially transparent active substrate 3 (e.g. glass or plastic), active matrix layer 5 including thin film transistors (TFTs) or diodes for selectively addressing pixels of the display, substantially transparent pixel electrodes 7 (e.g. of indium-tin-oxide or ITO), rear buffing or orientation film 9 (e.g. mechanically buffed polyimide) for aligning LC 11 molecules, twisted nematic liquid crystal (LC) layer 11, front orientation or buffing film 13 (e.g. mechanically buffed polyimide for aligning LC 11 molecules), front pixel electrode(s) 15 (e.g. common electrode of indium-tin-oxide or ITO), front spin-coated internal primary polarizer 17, front polarizer orientation or alignment layer 19, black matrix portions 21, red color filter 23, green color filter 25, blue color filter 27, front passive glass or plastic substantially transparent substrate 29, and finally optional front clean-up polarizer 31 for reducing ambient light reflection off of substrate 29, filters 23–27, and front-side electrode(s) 15.

Positioning primary front polarizer 17 interior (i.e. on the LC 11 side of) of color filters 23, 25, and 27 and between substrates 3 and 29 exposes to some degree the color filters to ambient light coming from the direction of display viewer 33. Such ambient light can increase both diffuse and specular reflectance. Providing optional clean-up external polarizer 31 on the front of the display as illustrated in FIG. 1 can reduce the reflectance from such exposed color filters, with the benefit of improved contrast ratio remaining.

In certain embodiments of this invention, front polarizer 17 may be spin-coated onto substrate 29 over polarizer alignment layer 19, with polarizer 17 then being photo-patterned into its desired shape. In such a manner, the alignment of the absorption axis or optical axis (41 or 43—see FIGS. 5 or 6) of polarizer 17 can be at any desirable angle or location as dictated by the alignment direction defined on the surface of layer 19 closest to and contacting polarizer 17. In other words, the buffing or other alignment direction 16 defined by layer 19 on its surface closest to layer 17 defines the axis 41, 43 orientation or direction of internal polarizer 17.

In certain embodiments of this invention, internal polarizer layers (e.g. 17) herein may be from about 1 to 3 $\mu$m thick, preferably about 1.5 to 2.5 $\mu$m thick. However, for embodiments herein where the combination of alignment layers 19 and immediately adjacent polarizers 17, 53 are provided exterior of the substrates or when they are made in roll form (e.g. see FIGS. 8–10), then those polarizer layers may be from about 5–30 $\mu$m thick. In certain embodiments, polarizer alignment layers (e.g. 19) herein may be from about 100 Å to 600 Å thick, more preferably from about 300–500 Å thick, and most preferably about 400 Å thick.

FIG. 7 shows rear polarizer 1 with axis 2, rear LC orientation or alignment layer 9 having orientation direction 10, nematic LC layer 11, front LC alignment layer 13 with alignment direction 14, internal polarizer 17 with axis 41, 43, and polarizer alignment layer 19 having alignment direction 16. The FIG. 7 optical configuration may be applicable to any embodiment herein.

In certain preferred embodiments, front internal polarizer 17 may be made of a reactive photo-polymerizable liquid crystalline (e.g. reactive mesogen RM 257 available from Merck) plus a dichroic dye. An example of a dichroic dye is dye model no. S428 Black, available from Mitsui Chemicals America, Purchase, N.Y. The combination of the reactive liquid crystalline (e.g. RM 257) and the dichroic dye achieves alignment of the dichroic dye molecules in the liquid crystalline layer thereby forming polarizer 17 including its absorption or polarizer axis 41, 43. The axis 41, 43 of each internal polarizer herein is shown in FIGS. 5 and 6 in different embodiments of this invention. As shown in FIG. 7, optical or transmission axis 41, 43 of front polarizer 17 may be aligned substantially perpendicular (plus/minus about 10 degrees in any direction) to the axis of the rear polarizer 1. Alternatively, the axis of the front polarizer may be aligned substantially parallel to the axis of the rear polarizer, or at any other desired angle relative thereto.

After being deposited, layer 17 may be photo-polymerized to permanently fix the alignment direction of the dichroic dye thereby permanently affixing the absorption or optical axis 41, 43 of front internal polarizer 17. Still further, the internal position of polarizer 17 between substrates 3 and 29 of the FIG. 1 display renders the display environmentally rugged, and also substantially eliminates or minimizes parallax found in conventional reflective LCDs.

The invention of any embodiment herein may be utilized in backlit liquid crystal displays, reflective liquid crystal displays, twisted nematic (TN) liquid crystal displays, super twisted nematic (STN) liquid crystal displays, and/or transflective LCDs.

Referring, for example, to FIGS. 1 and 7, front polarizer 17 may be manufactured as follows in certain embodiments to come up with the display, although this exemplary method of internal polarizer manufacture is not intended to be limiting as to the scope of inventions herein. The following polarizer production method enables an arbitrary placement or location of the polarizer absorption axis 41, 43 of layer 17 with respect to a polarizer edge 44. Accordingly, there is no significant material or product waste because the polarizers herein do not need to be cut from polarizer sheets or rolls. This, of course, is not the case for conventional polarizer production methods as discussed above. This production method eliminates the needs for a stretchable substrate for the polarizer. This method of manufacture further enables an array of different polarizer portions 17 to be patterned across the display viewing area, just as the retarders are patterned into an array of elements in the '126 patent.

In certain embodiments herein, photo-polymerizable reactive liquid crystalline material (e.g. RM 257 available from EM Industries, NY [Merck]) and dichroic dye(s) are chemically linked to form a material for use as layer 17. Approximately 5–30% (percent solids) [preferably about 10–20%] of dichroic dye may be used to make up the polarizer material, which thus includes about 70–95% (percent solids) RM 257. A small fraction of photoinitiators may be added to the reactive liquid crystalline material (e.g. RM 257) to make it photo-imageable and photo-patternable. This reactive mesogen (RM) based material or solution (including the dye, solution, and optionally the photoinitiators and applicable solvents) is then spin-coated or spun onto a buffed polyimide or other polarizer alignment material 19. The polarizer layer 17 may form a pre-tilt angle of from about 2–5 degrees at the interface of alignment layer 19 in certain embodiments of this invention, (e.g. see angle Φ in FIGS. 5–6). The liquid crystal and dichroic molecules within polarizer layer 17 will align with the underlining rubbing direction or orientation direction 16 on the interior surface of orientation layer 19 to form the optical or absorption axis 41, 43 of the polarizer 17. The result is a non-stretched polarizer layer or film 17 having an anisotropic absorption of light. The interaction of the reactive liquid crystalline material (e.g. RM 257) and the dichroic dyes of layer 17 and the immediately adjacent alignment or orientation layer 19 forces dye molecules and liquid crystal molecules in layer 17 to align in a parallel or perpendicular direction and in a homogenous manner to form and define polarizer axis 41, 43. Still with regard to layer 17, the reactive mesogen (e.g. RM 257) will form a nematic liquid crystalline phase on rubbed polyimide or alignment layer 19. It is also pointed out that RM 257 is simply an exemplary material for use as a base material for making up layer 17, and other reactive polymerizable liquid crystalline materials may instead be used. Also, any other suitable material may be used instead of RM 257 as the base material for internal polarizers in accordance with different embodiments of this invention(s). However, it is preferred that the material be photo-imageable or photo-patternable, although that need not necessarily be the case.

It is noted that polarizers 17, 53 herein are transparent to visible light rays in a manner similar to that of conventional stretched linear polarizers. For example, polarizer 17–53 have a transmission of from about 30–50% of naturally polarized visible light rays (i.e. non-polarized light).

Layer 17 is then pre-baked and exposed to a ultraviolet (UV) light source so as to cause photo-polymerization. Following ultraviolet illumination of the formed film 17, the reactive mesogen is cross-linked by a photo-polymerization process. The orientation of the nematic director and dye of layer 17 is thus fixed by photo-polymerization thereby forming the light polarizing layer 17 with polarizing axis 41, 43 (i.e. 41 or 43). Because reactive mesogens are photopolymerizable, layer 17 can also be patterned using photo-imaging and UV illumination at the pixel level. In other words, polarizing layer 17 is photo-imageable and may be multi-pixelated through an exposure and development process (i.e. as retarders are in the '126 patent). If patterning of layer 17 is desired, the layer 17 is exposed to the UV radiation by a stepper or through a mask so that unwanted portions can be etched away with development solution. Layer 17 is then hard baked after photo-imaging. Layer 17 may function as either a substantially transparent positive or negative resist according to different embodiments of this invention. It is noted that even when layer 17 is to form a substantially continuous polarizer across the viewing area of the display, that the layer 17 still may be photo-imaged using UV radiation as discussed above in order to remove unwanted peripheral areas of the layer before the LCD is finalized.

As shown in FIGS. 5 and 6, the nematic director 41, 43 configuration of polarizer layer 17 can be of constant tilt (FIG. 6), splay (i.e. tilt or pre-tilt angles in the layer vary through the layer's thickness), or splay twist (FIG. 5) according to different embodiments of this invention to be discussed below. For example, an anthrauine or azo dye dispensed in the anisotropic liquid crystalline for layer 17 will follow the nematic field resulting in an anisotropic polarizer absorption axis 41, 43. When, for example, azo dichroic dye is provided in the reactive mesogen to form a polarizer 17, 53, this particular type of dye causes the optical axis 41, 43 of the polarizer to become aligned perpendicular (i.e. at approximately a 90° angle±10°) relative to the underlying alignment direction 16 of the immediately adjacent polarizer alignment layer. However, in other embodiments of this invention, when, for example, an anthrauine dichroic dye is utilized in a reactive mesogen (e.g. RM 257 reactive liquid crystalline) to form a polarizer layer 17, 53 this type of dye causes the optical axis 41, 43 of the resulting polarizer to be aligned substantially parallel to (i.e. within about 10° in either direction) the underlying alignment direction 16 of the immediately adjacent polarizer alignment layer. Thus, when the anthrauine dye is used, this causes both the dye molecules and the molecules of the reactive crystalline solution/material to become aligned substantially homogeneously in a direction approximately the same as the underlying alignment direction 16.

As shown in FIG. 6, in certain preferred embodiments of this invention, layer 17 has a thickness "d", uniform tilt angle Φ throughout its thickness, and zero twist throughout its thickness. Because angle θ is substantially constant throughout the thickness "d" of the polarizer layer, then the polarizer shown in FIG. 6 has substantially no (or zero) twist. FIG. 6 shows the polarizer optical axis 41 with substantially uniform tilt Φ and zero twist throughout the thickness "d" of the polarizer layer. Thus, optical axis 41 is located at the same angle or position at the substantially planar surface of the polarizer closest to alignment layer 19 (i.e. at the X-Y plane in FIG. 6), as at the opposing substantially planar surface 44 of the polarizer (i.e. up the Z-axis). In FIG. 6, the opposing substantially planar surface is substantially parallel to the x-y plane, but is spaced therefrom up the z axis by the thickness "d" of the layer 17. Still referring to FIG. 6, angle θ is the azimuthal angle and as shown is substantially the same at both the interior and exterior 43 surfaces of the polarizer so that substantially no twist occurs.

As shown in FIG. 5, in other or alternative embodiments of this invention internal polarizer layer 17 may have an optical axis 43 with increasing tilt and optionally uniform twist throughout the thickness of the polarizer layer 17. As shown in FIG. 5, the optical axis 43 of the polarizer is aligned in one direction 45 at the substantially planar surface of the polarizer closest to its alignment layer 19, and in another direction 47 at the opposing substantially planar surface of the polarizer layer 17. The polarizer surface substantially at the x-y plane in FIG. 5 is adjacent the alignment layer 19, while the opposing surface of the polarizer is at a location substantially parallel to the x-y plane but spaced therefrom up the z-axis by an amount "d" defined substantially by the thickness of the layer 17. When angle β in FIG. 5 is not zero, then the direction of the optical axis 43 twists through an angle β throughout the thickness of the polarizer. Thus, angle β is the total twist angle. Meanwhile, angle Φ represents the tilt or pre-tilt angle at the surface of polarizer layer 17 closest to alignment layer 19, and angle θ represents the polar tilt angle of optical axis 43 at the opposing surface of layer 17. When angles θ and Φ in FIG. 5 are substantially the same, then there is no varying in tilt throughout the thickness of layer 17. However, when angles θ and Φ in FIG. 5 are substantially different, then the tilt of axis 43 varies by an amount corresponding to this difference throughout the thickness "d" of layer 17. Still referring to the FIG. 5 embodiment of a polarizer, twists β and increasing tilt angles may be caused by adding, for example, chiral dopant to the reactive liquid crystalline of layer 17. The addition of a chiral dopant to layer 17 may achieve a twisting of the liquid crystalline molecules and dye molecules throughout the thickness of the layer as shown in FIG. 5, and the amount of such chiral dopant added dictates the amount of twists and the amount of increasing tilt. Thus, different tilts and different total twists of the polarizer axis 43 can be achieved by adding different amounts of chiral dopant. The polar tilt angle of the dye and liquid crystalline molecules as shown in FIGS. 5 and 6 may be as small as 0.2° and as large as 10°. The polar tilt angle can be fixed (see FIG. 6) or vary (see FIG. 5) throughout the thickness of the polarizer layer. It is noted that the different embodiments shown and described relative to FIGS. 5 and 6 are applicable to all embodiments herein, including all polarizers which are internal to a display's substrates as shown for example in FIGS. 1, 2, 3, and 4.

Referring again to FIG. 6, the small polar tilt angle (e.g. from about 1–6°, preferably about 2°) Φ is substantially constant throughout the thickness "d" of polarizer layer 17, with FIG. 6 also illustrating substantially no twist throughout the thickness of the polarizer layer.

In different embodiments of this invention, the reactive liquid crystalline material for forming layer 17 may be uniaxial, biaxial, or disk-shaped, with uniaxial being preferred in certain embodiments. The liquid crystalline material (RM 257) may have a positive or alternatively a negative birefringence, with positive being preferred.

Figure 2:
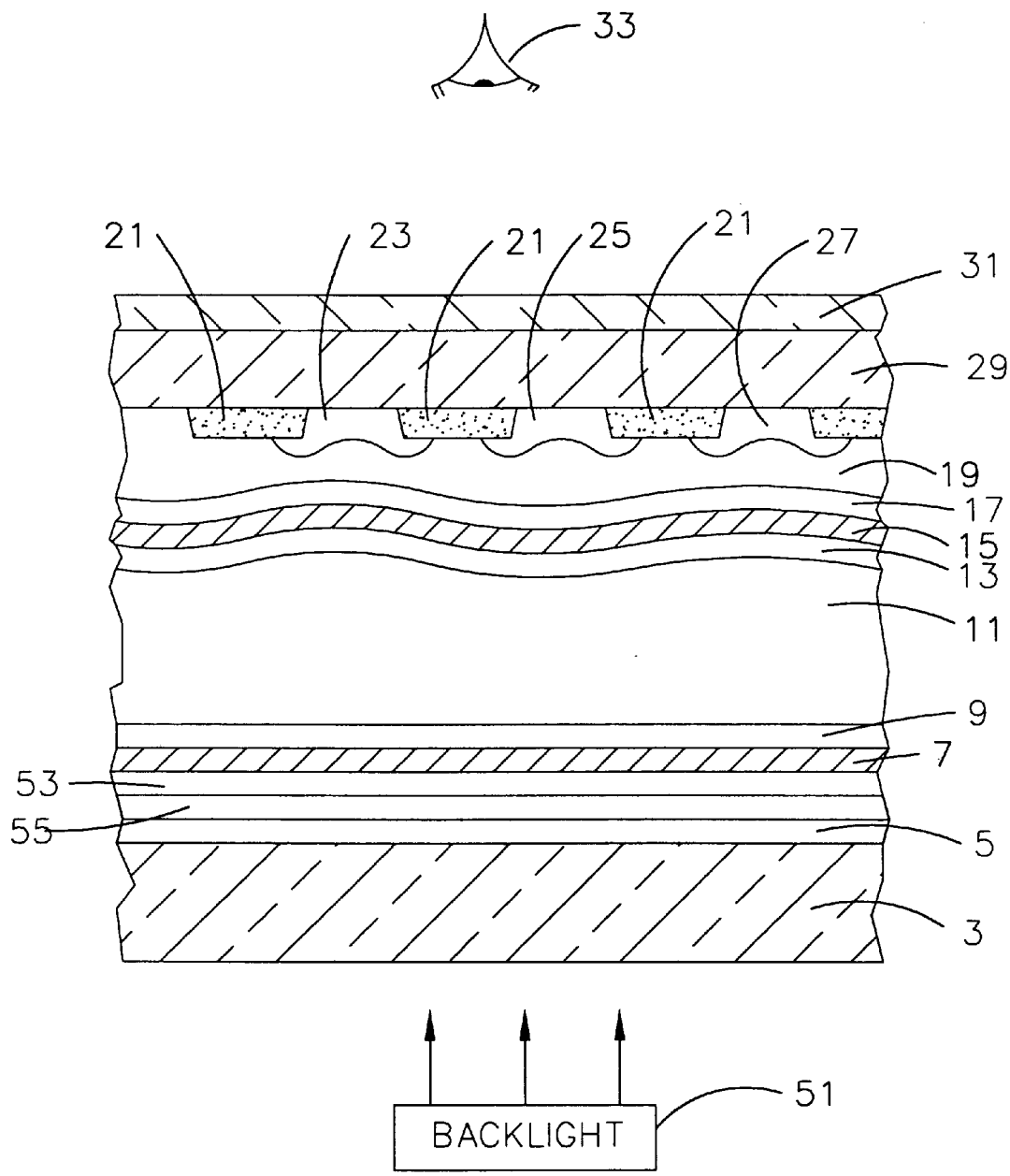
FIG. 2 is a side cross-sectional view of an LCD according to another embodiment of this invention, wherein polarizers on both sides of the liquid crystal (LC) material are positioned interior of their respective or supporting substrates.

FIG. 2 illustrates a display according to another embodiment of this invention. The display of FIG. 2 is similar to that of FIG. 1, except that in the FIG. 2 embodiment the polarizer 53 on the backlight 51 side of the nematic liquid crystal layer 11 is also located internally of the adjacent substrate 3. Thus, in the FIG. 2 embodiment, both a front polarizer 17 and a rear polarizer 53 are positioned internally of substrates 3 and 29. Rear internal polarizer 53 may be provided on substrate 3 over top of polarizer alignment or orientation layer 55 which defines a polarizer alignment direction similar to that 16 of layer 19, except that the alignment direction of layer 55 is in the direction of the rear polarizer axis as shown in FIG. 7 for example. Polarizer 53 may include dichroic dye dopant and reactive liquid crystalline material as discussed above, provided over top of alignment layer 55 in order to result in optical axis 41, 43 of polarizer 53 being defined. Polarizer 53 may have the same make-up as layer 17 described above with regard to materials used for forming it and the process used for forming it. In the FIG. 2 embodiment, just as in the FIG. 1 embodiment, it is possible but not required that a front clean-up polarizer 31 also be provided.

FIG. 3 is a side cross-sectional view of the passive plate of the FIG. 1 embodiment of this invention.

FIG. 4 is a side cross-sectional view of the passive plate of a liquid crystal display (LCD) according to yet another embodiment of this invention. As shown, the passive plate of the FIG. 4 embodiment includes anti-reflective coating 61 on its front surface, front substantially transparent glass substrate 29, internal polarizer alignment layer 63 (e.g. buffed or rubbed polyimide), front internal polarizer 65 (of the same or similar material as organic polarizer 17), black matrix portions 21, red color filter 23, green color filter 25, blue color filter 27, substantially transparent organic acrylic insulating layer 67 (e.g. Fuji Clear™ available from Fuji), pixel electrode(s) 69 (e.g. ITO), liquid crystal orientation or alignment layer 71 (e.g. rubbed or buffed polyimide), and finally nematic liquid crystal layer 73. The active plate is not shown in FIG. 4. Front polarizer layer 65 is located interior of front substrate 29. However, front polarizer 65 is provided between substrate 29 and the color filters 23–27. Because front polarizer 65 is located so close to the pixel apertures of the display interior of the substrates, adverse environmental effects are minimized. Polarizer layer 65 may be spin-coated onto alignment layer 63 as described above with respect to polarizer layer 17 and corresponding alignment layer 19.

FIG. 11 is a side cross-sectional view of another embodiment of this invention wherein a reactive liquid crystalline material (e.g. RM 257) including colored (e.g. red, green, or blue) dichroic dye therein functions as both color filters and polarizers. As shown, the FIG. 11 display includes from the rear forward rear linear stretched polarizer 1, rear substantially transparent glass substrate 3, active matrix layer 5, rear pixel electrode(s) 7, rear liquid crystal alignment or orientation film (e.g. buffed polyimide) 9, liquid crystal layer 11, front liquid crystal alignment or orientation film 13, front pixel electrode(s) 15, portions 81, 83, and 85 (e.g. reactive solution such as RM 257 liquid crystalline, including an appropriately colored dichoric dye added thereto) which function as both color filters and front polarizers, conventional black matrix portions 21, alignment layer 87 for alignment molecules in pixilated polarizers/color filters 81–85 so as to define their respective optical axes (alignment layer 87 may be a buffed or rubbed polyimide in certain embodiments), front substantially transparent substrate 29, and optional clean-up polarizer 31. According to this embodiment, appropriately colored red dichroic dye may be added to RM 257 (or any other appropriate reactive material) in order to form red color filters/polarizers 81, green color dichroic dye may be added to RM 257 to form green color filter 83, and blue dichroic dye may be added to RM 257 to form blue color filter 85. Of course, other colors may also be used. Patterned or pixilated polarizers/color filters 81–85 each include an optical axis 41, 43 which is defined by the alignment direction 16 of layer 87 so that portions 81–85 can function as individual discrete polarizers in a manner as described above herein. In certain embodiments, only one such filter/polarizer (81 or 83 or 85) may be provided in each pixel of the LCD.

In accordance with the FIG. 11 embodiment, alignment layer 87 is deposited on substrate 29 and thereafter a substantially continuous layer of RM 257 plus a first colored dichroic dye (e.g. red) is deposited thereon. The substantially continuous layer is then photo-imaged using ultraviolet radiation in order to remove portions thereof and form discrete red color filters/polarizers 81 across substrate 29. Then, another substantially continuous layer of RM 257 plus a second colored dichroic dye (e.g. green) is deposited on substrate 29 over top of layer 87 and the red color filters/polarizers 81. This latter substantially continuous layer is then patterned or photo-imaged using a mask and ultraviolet radiation to remove unwanted portions thereof so as-to result in an array of green color filters/polarizers 83 across substrate 29. Blue color filters 85 may be formed in a similar manner over top of the red and green color filters on substrate 29.

FIG. 12 is a side cross-sectional view of yet another embodiment of this invention wherein a reactive solution or material (e.g. RM 257) including dichroic dye and photo-initiators added thereto is patterned or photo-imaged on substrate 29 so as to form black matrix portions 91. The FIG. 12 display includes from the rear forward rear linear polarizer 1, rear substantially transparent substrate 3, active matrix layer 5, pixel electrode(s) 7, rear LC orientation or alignment layer 9, nematic LC layer 11, front LC alignment or orientation layer 13, front pixel electrode(s) 15, black matrix portions 91 formed of a reactive material (e.g. RM 257) including dichroic dye added thereto, black matrix alignment layer 93 (e.g. mechanically buffed or rubbed polyimide material), front substantially transparent substrate 29 and finally front linear polarizer 31. Black matrix portions 91 each have an optical axis 43 including some type of twist angle β as shown in FIG. 5. By depositing portions 91 so that their average direction of axis 43 is from about 45–135 degrees away from the direction of the optical axis of front polarizer 31, and adding optional chiral dopant to the reactive liquid crystalline solution to result in a twist angle β of from about 0–60 degrees throughout the thickness of each black matrix layer 91, portions 91 function as black matrix-like areas by preventing light which impacts upon portions 91 from reaching viewer 33. Because the polarization or optical axis 41, 43 of each black matrix portion 91 is substantially different than the polarizer axis of front polarizer 31, light which reaches and passes through portions 91 is mostly prevented from making its way through front polarizer 31 along with light which reaches polarizer 31 without passing through portions 91. Alignment layer 93 in the FIG. 12 embodiment may be a mechanically buffed or rubbed polyimide so that its alignment direction 16 causes the optical axis of black matrix portions 91 to be oriented in a manner substantially different than the polarization direction of front polarizer 31. In order to make the FIG. 12 LCD, polyimide layer 93 is deposited on substrate 29 and thereafter rubbed or buffed to define the black matrix alignment direction 16. Then, a substantially continuous layer of reactive liquid crystalline (e.g. RM 257) with dichroic and/or chiral dye or dopant optionally added thereto is deposited directly on top of alignment layer 93. This substantially continuous layer is photo-polymerized and photo-imaged using a mask in order to remove unwanted portions thereof thereby forming discrete black matrix-portions 91 across the viewing area of the display. Typically, black matrix portions 91 will be positioned only in areas between adjacent pixels, with pixel aperture areas of the display being free of black matrix portions 91.

FIGS. 8–10 are side cross-sectional views of polarizer structures which may be manufactured in roll form in accordance with different embodiments of this invention. These polarizer structures may be utilized either externally of the substrates in an LCD, or optionally internally of a display's substrates. In the FIG. 8 embodiment, substantially transparent substrate 101 is provided. A substantially continuous polyimide layer is then deposited on substrate 101 and thereafter mechanically rubbed or buffed to form alignment layer 102 (other types of alignment layers may instead be used) having an alignment direction 16. Then, a substantially continuous reactive layer (e.g. RM 257) 103 is deposited on top of alignment layer 102. Layer 103 may include, for example, reactive crystalline with dichroic dye added thereto as discussed above in order to form a polarizer layer 103. The molecules of layer 103 are mostly aligned in a direction dictated by the alignment direction 16 of layer 102. Depending upon the type of dichroic dye in layer 103, the optical axis 41, 43 of polarizer 103 may be perpendicular, parallel, or otherwise aligned relative to alignment direction 16 of layer 102. The FIG. 8 polarizer structure may be manufactured in mass production environments in roll form and may be utilized on the exterior of LCD substrates in a manner similar to conventional LCD polarizers.

FIG. 9 is a side cross-sectional view of a combination polarizer/retarder structure according to an embodiment of this invention. FIG. 9 is essentially the FIG. 8 structure further including a layer 104 of reactive liquid crystalline (e.g. RM 257) with chiral dopant added thereto formed on substrate 101 over top of layers 102–103. As discussed in commonly owned U.S. Ser. No. 09/057,601, filed Apr. 9, 1998, the disclosure of which is incorporated herein by reference, RM 257 with chiral dopant added thereto results in a retardation or optical compensation layer. Layer 104 may take the form of any retarder layer discussed in Ser. No. 09/057,601. The result is the FIG. 9 structure which functions as both a retarder and polarizer. This structure may be utilized both externally and internally of an LCD's substrates. In the FIG. 9 embodiment, polarizer layer 103 typically has an optical axis 41 with no substantial twist angle.

FIG. 10 is a side cross-sectional view of a combination polarizer/retarder structure according to still another embodiment of this invention. The FIG. 10 structure includes substrate 101, polarizer alignment layer 102 including alignment direction 16, polarizer layer 103 (e.g. RM 257 with chiral dopant and dichroic dye added thereto), retarder alignment layer 106 (e.g. mechanically buffed or rubbed polyimide with alignment direction 16), and retarder 104. In this particular embodiment, an additional retarder alignment layer 106 is provided when polarizer 103 has a substantial twist angle β defined through its thickness. As with the FIG. 8 embodiment and the FIG. 9 embodiment, the FIG. 10 structure can be mass produced in roll form and used either externally or internally of LCD substrates. In certain embodiments, substrate 101 may even be utilized as a display substrate 3, 29. Further with regard to the FIG. 8–10 embodiments, this type of polarizer does not require particular types of materials to be utilized as substrate 101. For example, substrate 101 according to this invention could be of substantially transparent glass, or even of PET material which is mechanically stable and birefringent.

It is noted that all alignment layers 19, 55, 63, 9, 13, 102, 106, 93, and 87 are preferably substantially transparent to visible light rays, as are all pixel electrodes discussed and illustrated herein.

Once given the above disclosure, many other features, modifications, and improvements will become apparent to the skilled artisan. Such other features, modifications, and improvements are, therefore, considered to be a part of this invention, the scope of which is to be determined by the following claims.

We claim:

1. A liquid crystal display comprising:
   first and second substrates;
   a liquid crystal layer positioned between said first and second substrates;
   electrodes for selectively applying voltage across said liquid crystal layer;
   first and second liquid crystal alignment layers provided on opposite sides of said liquid crystal layer so as to align molecules of said liquid crystal layer;
   a polarizer alignment layer disposed between said liquid crystal layer and said first substrate; and
   a first internal polarizer disposed directly adjacent said polarizer alignment layer, and said internal polarizer disposed between said liquid crystal layer and said first substrate.

2. The display of claim 1, further comprising color filters disposed between said first substrate and said internal polarizer.

3. The display of claim 1, further comprising a second internal polarizer positioned between said second substrate and said liquid crystal layer.

4. The display of claim 3, wherein said first internal polarizer includes a first optical axis and said second internal polarizer includes a second optical axis, and wherein said first and second optical axes are substantially perpendicular to one another.

5. A liquid crystal display comprising:
   first and second substrates;
   a liquid crystal layer positioned between said first and second substrates;
   at least one electrode for selectively applying a voltage to said liquid crystal layer;
   first and second polarizers positioned in a manner such that said first and second substrates are located in between said first and second polarizers, said first polarizer being located closest to a viewer of the display and including a polarizer optical axis;
   a substantially transparent black matrix alignment layer provided on said first substrate, said black matrix alignment layer defining an alignment direction; and
   a black matrix layer provided on said first substrate in a position so that said black matrix layer is in direct contact with said black matrix alignment layer, and wherein said black matrix alignment layer is substantially transparent to a substantial portion of visible light rays and includes a black matrix optical axis which is oriented in a substantially different direction than said polarizer optical axis.

6. The display of claim 5, wherein said black matrix layer includes reactive liquid crystalline.

7. The display of claim 5, wherein said black matrix layer is located interior of said first and second substrates, and wherein said black matrix optical axis twists over an angle β throughout the thickness of said black matrix layer.

* * * * *